United States Patent
Wurtenberger et al.

(10) Patent No.: US 9,319,991 B1
(45) Date of Patent: Apr. 19, 2016

(54) DYNAMICALLY ADJUSTING POWER SETTINGS BASED ON A GAIN MAPPING FILE

(71) Applicant: SPRINT COMMUNICATIONS COMPANY L.P., Overland Park, KS (US)

(72) Inventors: Andrew Mark Wurtenberger, Olathe, KS (US); Joshua Torey Koenig, Lawrence, KS (US); Sreekar Marupaduga, Overland Park, KS (US); Nicholas David Caola Kullman, Kansas City, MO (US); Patrick Jacob Schmidt, Bonner Springs, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 117 days.

(21) Appl. No.: 13/792,728

(22) Filed: Mar. 11, 2013

(51) Int. Cl.
*H04W 52/18* (2009.01)

(52) U.S. Cl.
CPC .................................... *H04W 52/18* (2013.01)

(58) Field of Classification Search
CPC ..................................................... H04W 64/00
See application file for complete search history.

(56) References Cited

U.S. PATENT DOCUMENTS

| | | | | |
|---|---|---|---|---|
| 6,144,646 | A * | 11/2000 | Bohlmann | H04W 52/343 370/311 |
| 2003/0211828 | A1 * | 11/2003 | Dalgleish | H04B 7/15535 455/11.1 |
| 2007/0249382 | A1 * | 10/2007 | Trachewsky et al. | H04W 52/24 455/522 |
| 2014/0051373 | A1 * | 2/2014 | Klomsdorf | H04B 1/0475 455/114.3 |

* cited by examiner

*Primary Examiner* — Bobbak Safaipour

(57) ABSTRACT

Systems, methods, and computer-readable media for dynamically adjusting power settings based on a gain mapping file are provided. In embodiments, the method includes receiving and interpreting a gain mapping file associated with an antenna. Transmit power levels are determined for each channel associated with the antenna. Transmit power levels are adjusted according to the determination and each channel is adjusted to have identical gain.

13 Claims, 3 Drawing Sheets

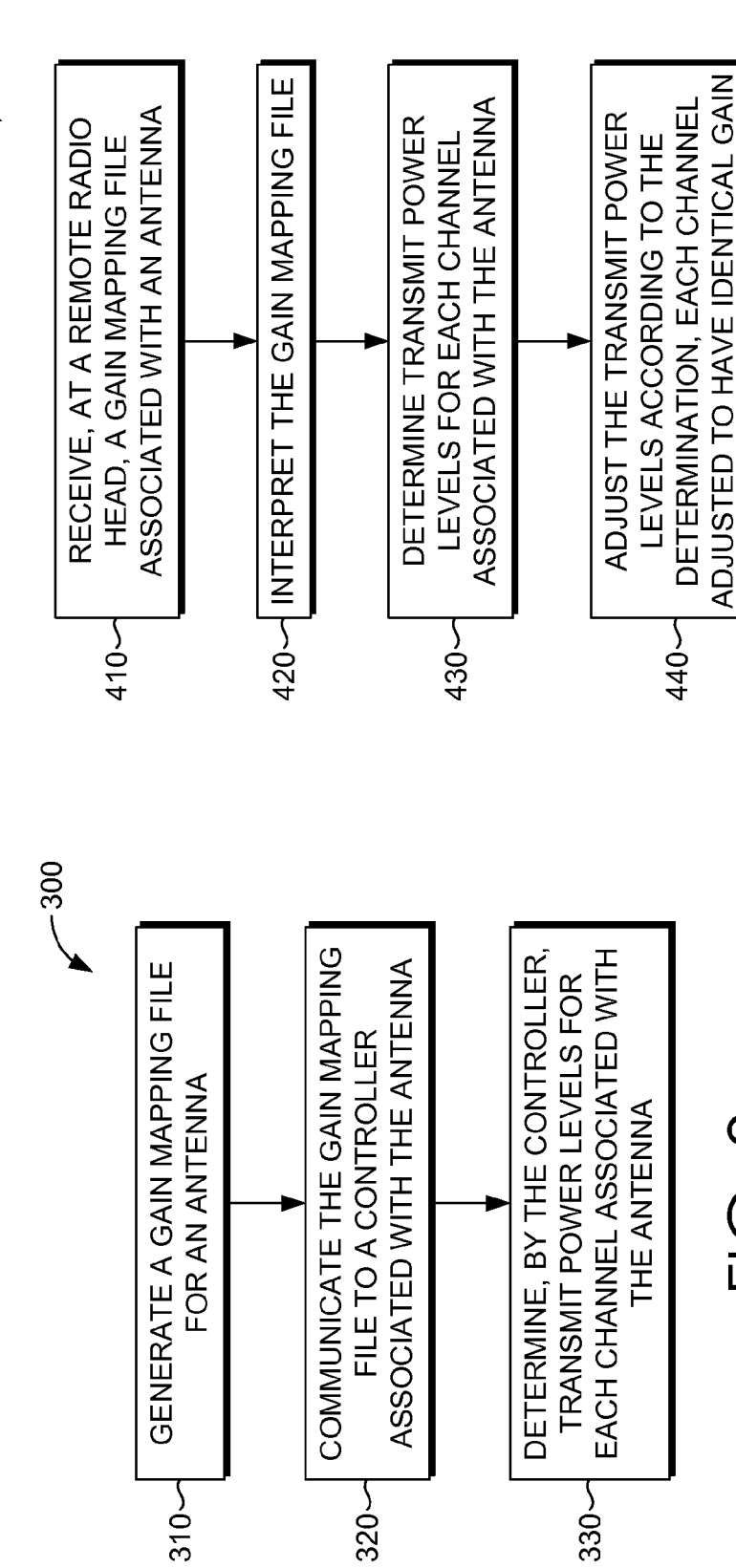

DYNAMICALLY ADJUSTING POWER SETTINGS BASED ON A GAIN MAPPING FILE

SUMMARY

A high-level overview of various aspects of the invention is provided here for that reason, to provide an overview of the disclosure, and to introduce a selection of concepts that are further described in the detailed-description section below. This summary is not intended to identify key features nor essential features of the claimed subject matter, nor is it intended to be used as an aid in isolation to determine the scope of the claimed subject matter. In brief, and at a high level, this disclosure describes, among other things, perform a method of dynamically adjusting power settings based on a gain mapping file. In embodiments, a gain mapping file is generated based on gain characteristics of an antenna. In embodiments, transmit power levels are adjusted for each channel transmitted by an antenna so that each channel has identical or nearly identical gain.

BRIEF DESCRIPTION OF THE SEVERAL VIEWS OF THE DRAWINGS

Illustrative embodiments of the present invention are described in detail below with reference to the attached drawing figures, and wherein:

FIG. 3 is a flow diagram depicting an illustrative method of dynamically adjusting power settings based on a gain mapping file, in accordance with embodiments of the invention; and FIG. 4 is a flow diagram depicting an illustrative method of dynamically adjusting power settings based on a gain mapping file, in accordance with embodiments of the invention.

DETAILED DESCRIPTION

Figure 1:
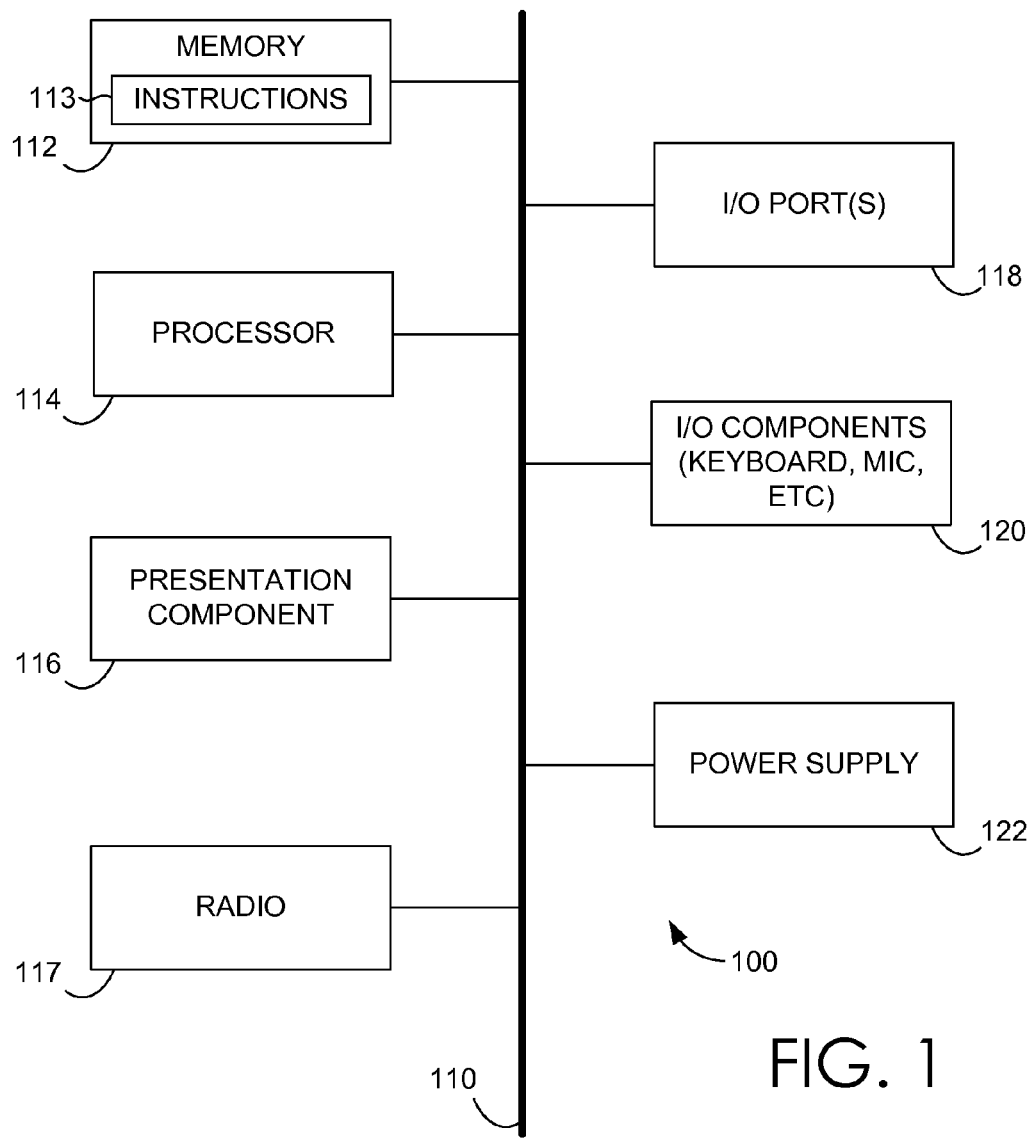
FIG. 1 depicts an illustrative device suitable for use in connection with embodiments of the invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

The process of wideband antenna production causes variations in antenna gain depending on the frequency being transmitted. The greater the range in frequency transmitted by an antenna, the greater the variation in gain produced. Because of the variation in gain, coverage areas between channels may be different which leads to less efficient wireless systems. Dropped calls, reduced throughput, and unbalanced coverage are often the result. Further exacerbating this problem, each antenna has unique characteristics making these issues impossible to address with a one-size fits all solution. More simply, gain versus frequency varies from antenna to antenna.

Embodiments of the present invention are directed to dynamically adjust transmit power levels based on a gain mapping file. In embodiments, a gain mapping file is generated based on gain characteristics of an antenna. Each antenna has unique gain characteristics. In embodiments, the transmit power levels are adjusted for each channel in accordance with an interpretation of the gain mapping file and a determination by the controller. In embodiments, the transmit power levels are adjusted so that each channel has identical or nearly identical gain. For clarity, nearly identical gain indicates that the gain associated with each channel is within a desired range relative to each other such that issues related to dropped calls, reduced throughput, and unbalance coverage are removed or reduced to meet a desired performance. Embodiments of the present invention improve quality of service by reducing dropped calls, increasing data throughput, and creating a more balanced coverage map. Further, embodiments of the present invention decrease interference between neighboring cells.

Accordingly, in one aspect, embodiments of the present invention are directed to computer storage media having computer-executable instructions embodied thereon that, when executed, perform a method of dynamically adjusting transmit power levels based on a gain mapping file. The method comprises: generating a gain mapping file for an antenna; communicating the gain mapping file to a controller associated with the antenna; and receiving, from the controller, transmit power levels for each channel associated with the antenna.

In another aspect, embodiments of the present invention are directed to computer storage media having computer-executable instructions embodied thereon that, when executed, perform a method of dynamically adjusting transmit power levels based on a gain mapping file. The method comprises: receiving, at a remote radio head, a gain mapping file associated with an antenna; interpreting the gain mapping file; determining transmit power levels for each channel associated with the antenna; and adjusting the transmit power levels according to the determination, each channel adjusted to have identical gain.

In yet another aspect, embodiments of the present invention are directed to a computer system for dynamically adjusting transmit power levels based on a gain mapping file. The computer system comprises a processor coupled to a computer-storage medium, the computer-storage medium having stored thereon a plurality of computer software components executable by the processor. The computer software components comprise: a generation component that generates a gain mapping file for an antenna based on gain characteristics of the antenna; a communication component that communicates the gain mapping file to a controller associated with the antenna; an interpretation component that interprets the gain mapping file; and a determination component that determines transmit power levels for each channel associated with the antenna based on the interpretation.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Telephone Technology
4G Fourth-Generation Wireless Telephone Technology
CDMA Code Division Multiple Access CD-ROM Compact Disk Read Only Memory
CRM Customer Relations Management
DVD Digital Versatile Discs
EEPROM Electrically Erasable Programmable Read Only Memory
ENODEB Evolved Node B
GPRS General Packet Radio Service
GPS Global Positioning System
GSM Global System for Mobile Communications
HLR Home Location Register
iDEN Integrated Digital Enhanced Network
LTE Long Term Evolution
MSC Mobile Serving Center
MMS Multimedia Messaging Service
PC Personal Computer
PCS Personal Communications Service
PDA Personal Digital Assistant
PLMN Public Land Mobile Network
RAM Random Access Memory
RF Radio Frequency
ROM Read Only Memory
SIB2 SystemInformationBlockType2
SLA Service Level Agreement
SMS Short Message Service
TDMA Time Division Multiple Access
UMTS Universal Mobile Telecommunications Systems
VoIP Voice over IP
Wi-Fi Wireless Fidelity
WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the present invention can take the form of a method, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include media implemented in any method or technology that stores information. Examples of stored information include computer-useable instructions, data structures, program modules, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. In one embodiment, memory 112 includes a set of embodied computer-executable instructions 113 that, when executed, facilitate various aspects disclosed herein. These embodied instructions will variously be referred to as "instructions" or "application" for short.

Processor 114 might actually be multiple processors that receive instructions 113 and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
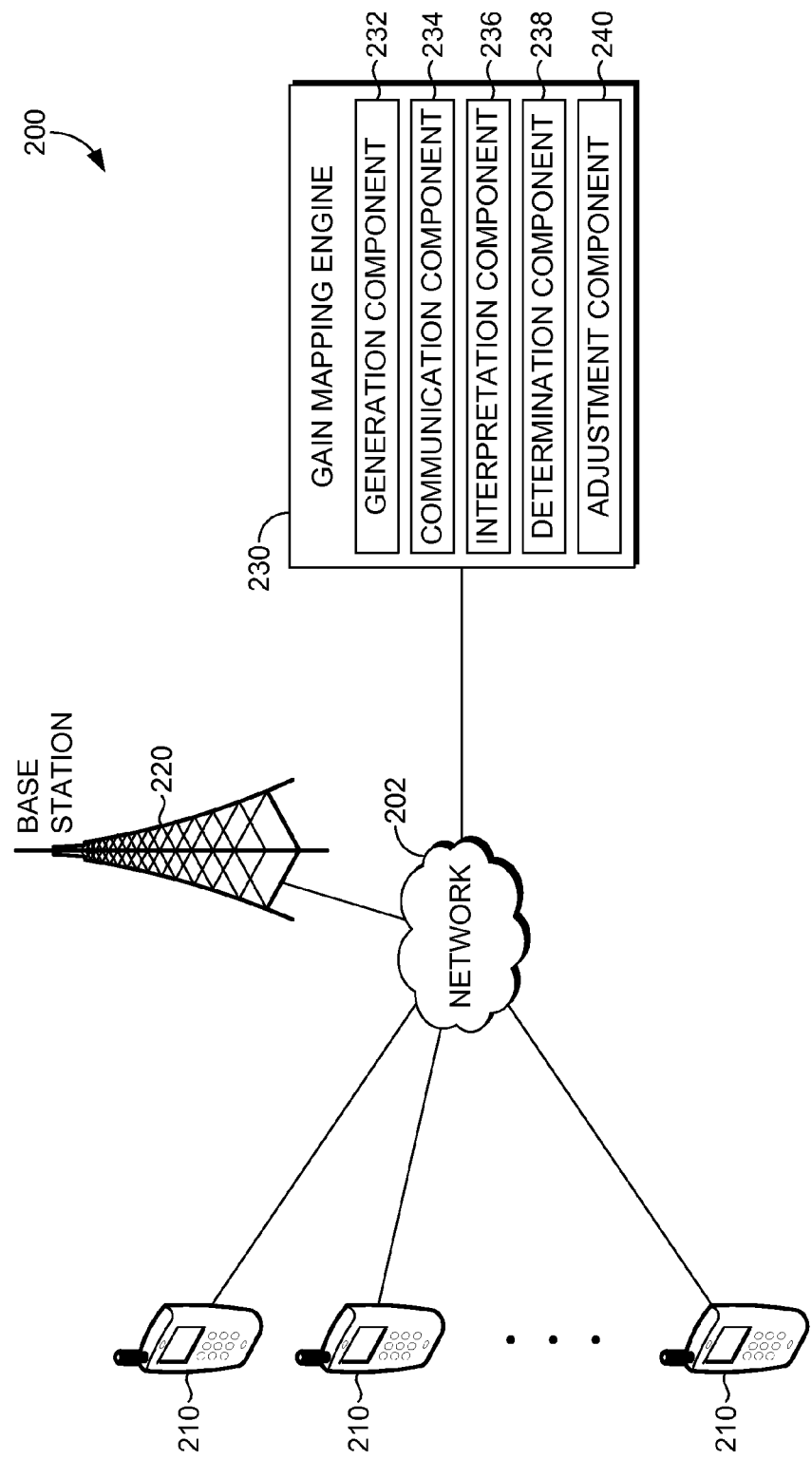
FIG. 2 is a schematic view of an exemplary network environment suitable for performing embodiments of the invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a user device 210 may communicate with other devices, such as mobile devices, servers, etc. The user device 210 may take on a variety of forms, such as a personal computer (PC), a laptop computer, a tablet, a netbook, a mobile phone, a Smart phone, a personal digital assistant (PDA), or any other device that is cable of communicating with other devices. For example, the user device 210 can take on any form, such as, for example, a mobile device or any other computing device capable of wirelessly communicating with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device can be any mobile computing device that communicates by way of, for example, a 3G or 4G network.

The user device 210 can utilize a network 202 to communicate with other computing devices (e.g., a mobile device(s), a server(s), a personal computer(s), etc.). In embodiments, the network 202 is a telecommunications network(s), or a portion thereof. A telecommunications network might include an array of devices or components (e.g., base station 220), some of which are not shown so as to not obscure more relevant aspects of the invention. Components such as terminals, links, and nodes (as well as other components) can provide connectivity in some embodiments. The network 202 can include multiple networks, as well as being a network of networks, but is shown in more simple form so as to not obscure other aspects of the present invention. The network 202 can be part of a telecommunication network that connects subscribers to their immediate service provider. In embodiments, the network can be associated with a telecommunications provider that provides services (e.g., LTE) to user devices, such as user device 210. For example, the network 202 may provide voice services to user devices or corresponding users that are registered or subscribed to utilize the services (e.g., LTE) provided by a telecommunications provider. The network 202 can be any communication network providing voice and/or data service(s), such as, for example, a 1x circuit voice, a 3G network (e.g., CDMA, CDMA2000, WCDMA, GSM, UMTS), or a 4G network (WiMAX, LTE, HSDPA).

Base station 220 includes an antenna comprising one or more ports and transmitting at more than one frequency or channel. For example, the antenna may support multiple channels within a network or multiple channels within multiple networks. Often antennas transmit at multiple frequencies for a particular service (e.g., 3 channels supporting CDMA and 4 channels supporting EVDO). As can be appreciated, many combinations of services and number of channels supporting each service can be provided by a single antenna.

In implementation, base station 220 is associated with gain mapping engine 230 that is utilized, in various embodiments, to dynamically adjust transmit power levels based on a gain mapping file. Gain mapping engine 230, in various embodiments, includes generation component 232, communication component 234, interpretation component 236, determination component 238, and adjustment component 240. In embodiments, the functionality of one or more components of gain mapping engine 230 is provided by the controller.

Generation component 232 generates a gain mapping file for an antenna based on gain characteristics of the antenna. In one embodiment, the gain mapping file is based on gain characteristics of the antenna. In one embodiment, the gain characteristics represent gain versus frequency associated with each channel supported by the antenna. In one embodiment, the gain mapping file comprises a separate port gain mapping file for each port associated with the antenna.

Communication component 234 communicates the gain mapping file to a controller associated with the antenna. In one embodiment, the controller is associated with a remote radio head. Interpretation component 236 interprets the gain mapping file. In one embodiment, interpretation component 236 is associated with the controller.

Determination component 238 determines transmit power levels for each channel associated with the antenna based on the interpretation. In one embodiment, the transmit power levels are determined for each channel on each port associated with the antenna.

In one embodiment, adjustment component 240 adjusts the transmit power levels for each channel based on the determination. In one embodiment, the transmit power levels are adjusted so that each channel has an identical gain. In one embodiment, the transmit power levels are adjusted according to the determination. In one embodiment, each channel on each port is adjusted to have identical gain.

Referring now to FIG. 3, a flow diagram depicts an illustrative method 300 of dynamically adjusting power based on a gain mapping file, in accordance with embodiments of the invention. At step 310, a gain mapping file is generated for an antenna. In one embodiment, the gain mapping file is based on gain characteristics of the antenna. In one embodiment, the gain characteristics represent gain versus frequency.

At step 320, the gain mapping file is communicated to a controller associated with the antenna. In one embodiment, the controller is a remote radio head. In one embodiment, the gain mapping file is interpreted by the controller.

The controller determines, at step 330, transmit power levels for each channel associated with the antenna. In one embodiment, the transmit power levels are adjusted for each channel. In one embodiment, the transmit power levels are adjusted so that each channel has an identical gain. In one embodiment, the transmit power levels are determined based on an interpretation of the gain mapping file.

Referring now to FIG. 4, a flow diagram depicting an illustrative method 400 of dynamically adjusting power based on a gain mapping file, in accordance with embodiments of the present invention. Initially, at step 410, receiving, at a remote radio head, a gain mapping file associated with an antenna.

At step 420, the gain mapping file is interpreted. In one embodiment, the gain mapping file is based on gain characteristics of the antenna. In one embodiment, the gain characteristics represent gain versus frequency.

Transmit power levels are determined, at step 430, for each channel associated with the antenna. In one embodiment, the transmit power levels are determined based on the interpretation of the gain mapping file.

The transmit power levels are adjusted according to the determination at step 440. Each channel is adjusted to have identical gain. In other words, the transmit power levels are adjusted for each channel supported by the antenna so the gain observed at each channel is identical.

In one embodiment, the gain mapping file comprises a separate port gain mapping file for each port associated with the antenna. In one embodiment, transmit power levels are determined for each channel on each port associated with the antenna. In one embodiment, the transmit power levels are adjusted according to the determination, each channel on each port adjusted to have identical gain.

Many different arrangements of the various components depicted, as well as components not shown, are possible without departing from the scope of the claims below. Embodiments of our technology have been described with the intent to be illustrative rather than restrictive. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need to be carried out in the specific order described.

The invention claimed is:

1. Computer storage device having computer-executable instructions embodied thereon that, when executed by one or more computing devices, cause the one or more computing devices to perform a method of dynamically adjusting power settings based on a gain mapping file, the method comprising:

generating a gain mapping file for a base station antenna, wherein the gain mapping file comprises a separate port gain mapping file for each port associated with the base station antenna;

communicating the gain mapping file to a controller associated with the base station antenna;

receiving, from the controller, transmit power levels for each channel on each port associated with the base station antenna; and adjusting the transmit power levels for each channel on each port, wherein the transmit power levels are adjusted so that each channel on each port has an identical gain.

2. The media of claim 1, further comprising interpreting the gain mapping file.

3. The media of claim 2, wherein gain mapping file is based on gain characteristics of the base station antenna.

4. The media of claim 3, wherein the gain characteristics represent gain versus frequency.

5. The media of claim 1, wherein the transmit power levels are determined based on an interpretation of the gain mapping file.

6. The media of claim 1, wherein the controller is associated with a remote radio head.

7. Computer storage device having computer-executable instructions embodied thereon that, when executed by one or more computing devices, cause the one or more computing devices to perform a method of dynamically adjusting power settings based on a gain mapping file, the method comprising:

receiving, at a remote radio head, a gain mapping file associated with a base station antenna, wherein the gain mapping file comprises a separate port gain mapping file for each port associated with the base station antenna;

interpreting the gain mapping file;

determining transmit power levels for each channel on each port associated with the base station antenna; and adjusting the transmit power levels according to the determination, each channel on each port adjusted to have identical gain.

8. The media of claim 7, wherein the gain mapping file is based on gain characteristics of the base station antenna.

9. The media of claim 8, wherein the gain characteristics represent gain versus frequency.

10. The media of claim 8, wherein the transmit power levels are determined based on the interpretation of the gain mapping file.

11. A computer system for dynamically adjusting power settings based on a gain mapping file, the computer system comprising a processor coupled to a computer-storage device, the computer-storage device having stored thereon a plurality of computer software components executable by the processor, the computer software components comprising:

a generation component that generates a gain mapping file for base station antenna based on gain characteristics of the base station antenna, wherein the gain mapping file comprise a separate port gain mapping file for each port associated with the base station antenna;

a communication component that communicates the gain mapping file to a controller associated with the base station antenna;

an interpretation component that interprets the gain mapping file;

a determination component that determines transmit power levels for each channel on each port associated with the base station antenna based on the interpretation; and comprising an adjustment component that adjusts the transmit power levels for each channel on each port based on the determination, wherein the transmit power levels are adjusted so that each channel on each port has an identical gain.

12. The computer system of claim 11, wherein the gain characteristics represent gain versus frequency.

13. The computer system of claim 12, wherein the controller is associated with a remote radio head.

\* \* \* \* \*